R. W. JORRES.
BREAD BOX.
APPLICATION FILED DEC. 14, 1908.
933,711.
Patented Sept. 7, 1909.
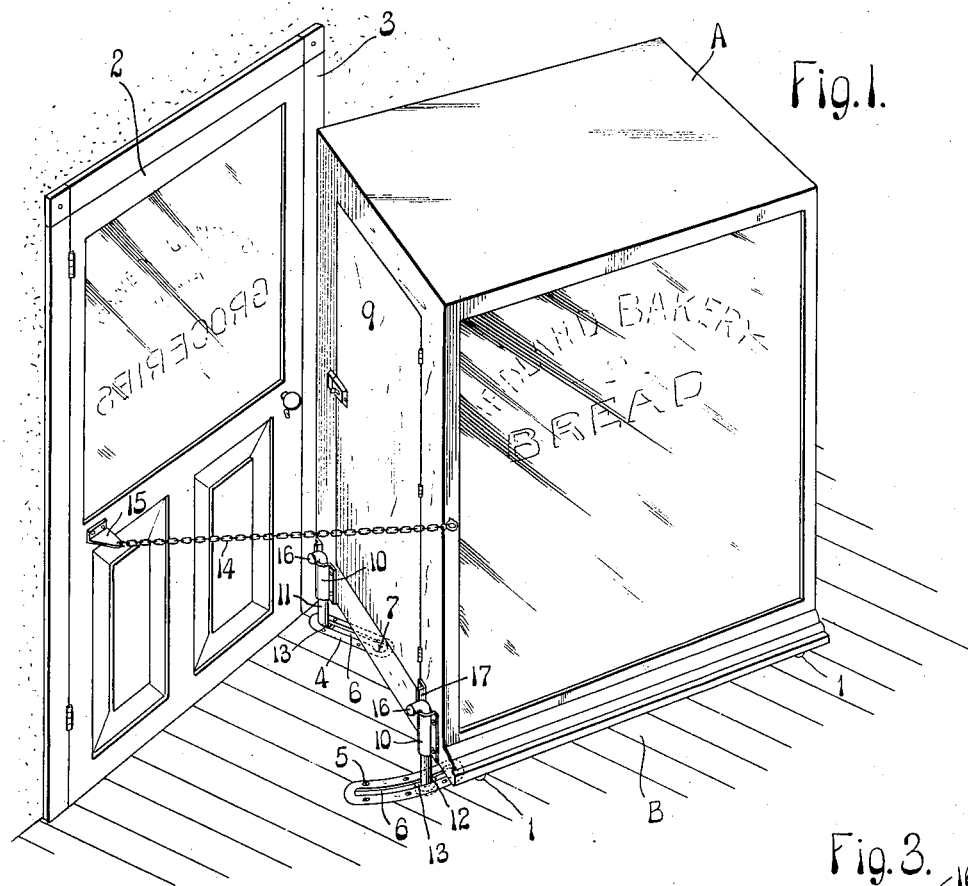
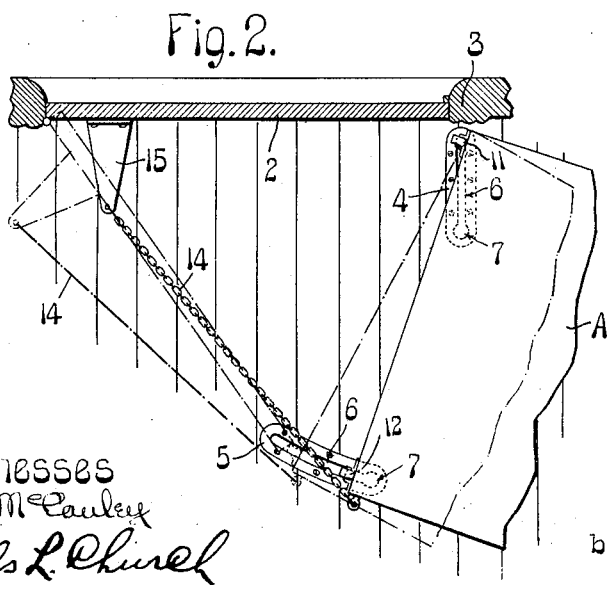
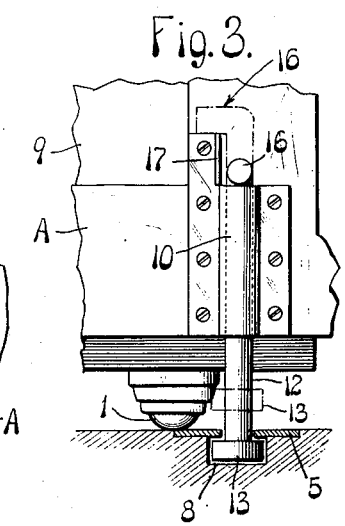
Witnesses
A. J. McCauley
Wells L. Church
Inventor:
Ralph W. Jorres
by Bakewell Cornwall
Att'ys.

UNITED STATES PATENT OFFICE.

RALPH W. JORRES, OF ST. LOUIS, MISSOURI, ASSIGNOR TO HEIDLAND BAKING COMPANY, OF ST. LOUIS, MISSOURI, A CORPORATION OF MISSOURI.

BREAD-BOX.

933,711.          Specification of Letters Patent.      Patented Sept. 7, 1909.

Application filed December 14, 1908. Serial No. 467,419.

*To all whom it may concern:*

Be it known that I, RALPH W. JORRES, a citizen of the United States, residing at St. Louis, Missouri, have invented a certain new and useful Improvement in Bread-Boxes, of which the following is a full, clear, and exact description, such as will enable others skilled in the art to which it appertains to make and use the same, reference being had to the accompanying drawings, forming part of this specification, in which—

Figure 1 is a perspective view illustrating a bread box constructed in accordance with my invention; Fig. 2 is a detail top plan view illustrating the positions that the box assumes when the door with which it coöperates is closed and when it is opened; and Fig. 3 is a detail view of a portion of the box illustrating one of the devices used for connecting the box to the floor of the store.

This invention relates to bread boxes such as are generally used in grocery stores for containing the bread that the grocer has for sale.

It is customary for bakers who supply bread to grocery stores to deliver the bread early in the morning before the grocer has opened the store, and it has heretofore been the general practice to place a bread box or receptacle outside of the store in which the baker could deposit the bread. In view of the fact that these bread boxes are arranged outside of the store they are exposed to the weather and soon become unsanitary from various causes so that they have not proved satisfactory as receptacles for bread and other bakery products.

The main object of my invention is to provide a bread box or receptacle that is adapted to be arranged inside of a store adjacent the door of the store, and means for causing said box to move into a position to obstruct the passage into the store when the door is opened partially, said box moving into such position, however, that the baker can deposit the bread therein and then close and lock the store door.

Referring to the drawings which illustrate the preferred form of my invention, A designates a box or receptacle of any preferred shape and dimensions that is adapted to contain bread and other bakery products, and 1 designates casters on the bottom of said box which permit the box to be shifted about easily. The box is arranged inside of a store and during the hours that the store is open to the public the box can be placed at any desired point in the store. When the store is closed at night, however, the box is arranged adjacent the door 2 of the store, as shown in Fig. 1, so that one corner of the box lies close to the door jamb 3 or frame inside of which the door is located, the door being hinged to its frame in such a manner that it opens when it is swung inwardly. A pair of socket pieces 4 and 5 are connected to the floor B of the store adjacent the door 2, and each of said socket pieces has an elongated slot 6 that terminates at one end in an enlarged opening 7, the portion of the floor B underneath said socket pieces being cut away to form channels or grooves 8, as shown in Fig. 3, that receive devices on the box A and thus prevent the box from being lifted or moved vertically relatively to the floor. The front wall of the box A is provided with a door 9, and bearings 10 are also connected to said front wall adjacent the lower edge thereof to receive locking devices 11 and 12. The locking device 11 coöperates with the socket piece 4 and the locking device 12 coöperates with the socket piece 5, and each of said locking devices is provided at its lower end with a head 13 of greater width than the slots 6 in said socket pieces but of less width than the channels or grooves 8 in the floor so that they can lie in said channels. The slot 6 in the socket piece 5 is curved on an arc whose center is the outer end of the straight slot 6 in the socket piece 4 so that when the box A is in operative position it can swing about the device 11 as a fulcrum.

To arrange the box in position it is first moved into such a position that the head 13 on the device 11 alines with the enlarged opening 7 in the socket piece 4, said device being then moved downwardly so that its head will enter the groove or channel 8 in the floor. The box is then moved toward the door jamb 3 so that the device 11 will be positioned in the outer end of the slot 6 in the socket piece 4, and when the head on the locking device 12 comes into alinement with the enlarged opening in its coöperating socket piece 5, said device is moved downwardly so that the head thereon will enter the channel underneath said socket piece. The box is then connected to the store door 2 by means of a chain 14 or other suitable connecting member that leads from one corner of the box to an arm or bracket 15 on the inner face of the door. If the door is opened after the box has been arranged in this position the box will be turned about the locking device 11 as a fulcrum and thus bring the front wall of the box up against the vertical edge of the door, as shown in broken lines in Fig. 2, the box coöperating with the door to obstruct the passage into the store. Although the box prevents the baker or person who opens the door from passing into the store still the baker can place bread or any other articles in the box by simply opening the door 9 in the front wall of the box, it being understood, of course, that the baker has a key which will open the store door. The heads 13 on the locking devices coöperate with the socket pieces connected to the floor to prevent the box from being raised or moved vertically, and as the box is securely connected to the inner face of the door by the chain 14, it will be impossible to open the door more than half way without breaking said chain. After the store has been opened for business in the morning the box can be moved away from the door, the box being released by disconnecting the chain 14 and disengaging the locking devices from their coöperating socket pieces. As shown clearly in Fig. 3, each of the locking devices is provided at its upper end with a handle or extension 16 that can be turned into the position shown in broken lines in Fig. 3 so as to engage a lug or flange 17 on the bearing 10 and thus retain the locking device in an elevated position.

While I have herein stated that the box A is intended to be used for containing bread, it will, of course, be obvious that it could be used for various other purposes without departing from the spirit of my invention, and that various other means than those herein shown could be employed for connecting the box to the floor or supporting surface on which it rests and to the door with which it coöperates to obstruct the passage into the building in which the box is located. The box could also be used with a swinging window if desired and therefore the term "door" in the claims should be construed to cover a door, window or any other swinging member that closes an opening.

While I prefer to permanently connect the chain 14 to the inner face of the door 2, said chain could pass through an opening in the door and be secured to the outer face of the door by means of a padlock or other suitable locking device so as to enable the owner of the store to use the door 2 when he leaves the store or enters same.

Having thus described my invention, what I claim as new and desire to secure by Letters Patent is:

1. In combination, a swinging closure, a rectangular-shaped receptacle arranged adjacent said closure, and means for causing said receptacle to move into engagement with the vertical edge of said closure when the closure is opened; substantially as described.

2. In combination, a swinging door that closes an opening in a wall, a rectangular-shaped receptacle having one of its corners arranged adjacent the door jamb, and means for causing said receptacle to swing about a fulcrum and thus bring its front face into engagement with the vertical edge of the door when the door is opened; substantially as described.

3. In combination, a swinging door that closes an opening in the wall of a building, a receptacle arranged inside of said building with one of its corners adjacent the front edge of the door, means for preventing said receptacle from being raised vertically from the floor on which it rests, and a connection between said receptacle and the door whereby said receptacle is swung into engagement with the front edge of the door when the door is opened so as to obstruct the passage into the building; substantially as described.

4. A box for containing bakery products, consisting of a rectangular-shaped receptacle adapted to be arranged inside of a building adjacent the door in the building, means for pivotally connecting said receptacle to the floor of the building, and means for causing said receptacle to move into such a position that it obstructs the passage into the building when the door is opened partially; substantially as described.

5. A box for containing bakery products, comprising a rectangular-shaped receptacle provided in its front wall with a door, coöperating devices on said receptacle and on the floor on which it rests for causing the receptacle to swing in a certain path without being able to move vertically relatively to the floor, and a connection between said receptacle and the door of the building inside of which it is located for causing the receptacle to move into position to block the entrance into the building when the door of same is opened partially; substantially as described.

6. A box for containing bakery products, consisting of a rectangular-shaped receptacle provided with casters, socket pieces connected to the floor on which said receptacle rests, devices on said receptacle that are adapted to coöperate with said socket pieces to cause the receptacle to travel in a certain path and also prevent it from being moved vertically, a swinging door located adjacent said receptacle, and a connection between said door and said receptacle for causing the receptacle to move into position to block the entrance to the door when the door is partially opened; substantially as described.

7. A box for containing bakery products, consisting of a rectangular-shaped receptacle provided in its front wall with a door, casters for supporting said receptacle, movable locking devices connected to said receptacle and provided at their lower ends with enlarged heads, and socket pieces connected to the floor on which the receptacle rests and coöperating with the heads on said locking devices to prevent the receptacle from being raised or lifted from the floor; substantially as described.

8. A box for containing bakery products, consisting of a rectangular-shaped receptacle provided in its front wall with a door, vertically movable locking devices arranged in bearings on said receptacle and provided at their lower ends with enlarged heads that are adapted to travel in channels or grooves formed in the floor on which the receptacle rests, and plates connected to the floor over said channels and provided with slots through which the shanks of said locking devices pass; substantially as described.

9. A box for containing bakery products, consisting of a receptacle provided in one wall with a door, casters for supporting said receptacle, guides connected to the floor on which the receptacle rests, devices on the receptacle that coöperate with said guides to prevent the receptacle from being lifted or raised from the floor, a swinging door located adjacent said receptacle, and a connection leading from the inner face of said door to one corner of said receptacle; substantially as described.

10. A box for containing bakery products, consisting of a rectangular-shaped receptacle provided with a door, casters on the bottom of said receptacle, bearings connected to said receptacle, vertically movable locking devices arranged in said bearings and provided at their lower ends with enlarged heads which are adapted to coöperate with members connected to the floor on which the receptacle rests to cause the receptacle to move in a certain path, and means for retaining said locking devices in an inoperative position; substantially as described.

In testimony whereof I hereunto affix my signature in the presence of two witnesses, this sixth day of November, 1908.

RALPH W. JORRES.

Witnesses:
 WELLS L. CHURCH,
 GEORGE BAKEWELL.